United States Patent
Miyoshi et al.

(10) Patent No.: US 7,206,296 B2
(45) Date of Patent: Apr. 17, 2007

(54) TRANSMITTING DEVICE AND TRANSMITTING METHOD

(75) Inventors: Kenichi Miyoshi, Yokohama (JP); Masaki Hayashi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1075 days.

(21) Appl. No.: 10/204,356

(22) PCT Filed: Jan. 11, 2002

(86) PCT No.: PCT/JP02/00116

§ 371 (c)(1),
(2), (4) Date: Aug. 20, 2002

(87) PCT Pub. No.: WO02/056504

PCT Pub. Date: Jul. 18, 2002

(65) Prior Publication Data

US 2003/0091008 A1  May 15, 2003

(30) Foreign Application Priority Data

Jan. 12, 2001  (JP) ............................ 2001-005678

(51) Int. Cl.
*H04Q 7/20* (2006.01)
(52) U.S. Cl. ...................... 370/328; 370/329; 455/522
(58) Field of Classification Search ................ 370/252, 370/335, 342; 455/522
See application file for complete search history.

(56) References Cited

U.S. PATENT DOCUMENTS 6,317,435 B1 * 11/2001 Tiedemann et al. ......... 370/441
6,591,113 B1 *  7/2003 Mortensen .................. 455/522
6,647,055 B2 * 11/2003 Kuo ........................... 375/148

(Continued)

FOREIGN PATENT DOCUMENTS

JP     2000 513557      10/2000

(Continued)

OTHER PUBLICATIONS

WCDMA—the radio interface for future mobile multimediacommunications; This paper appears in: Vehicular Technology, IEEE Transactions on Publication Date: Nov. 1998 vol. 47, Issue: 4 On p. 1105-1118.*

(Continued)

*Primary Examiner*—Hassan Kizou
*Assistant Examiner*—Salman Ahmed
(74) *Attorney, Agent, or Firm*—Stevens, Davis, Miller & Mosher, LLP (57) ABSTRACT

A transmission apparatus capable of executing an appropriate transmission power control in DPCH even when the DSCH and DPCH are multiplexed together. In the present transmission apparatus, DPCH transmission power control section 105 controls the transmission power of dedicated channel so that transmission power in periods corresponding to packet insertion periods of downlink shared channel becomes larger than that in other periods. Amplification sections 104-1 to 104-N amplify the transmission power of dedicated channel based on the control of DPCH transmission power control section 105. Dedicated channel and downlink shared channel are multiplexed in multiplexing section 106. The multiplexed signal is converted into radio frequency in RF section 107, and then transmitted as radio signal from antenna 108.

8 Claims, 7 Drawing Sheets

FIG.2

U.S. PATENT DOCUMENTS

| | | |
|---|---|---|
| 6,757,319 B1 * | 6/2004 | Parsa et al. ................. 375/141 |
| 6,904,290 B1 * | 6/2005 | Palenius ..................... 455/522 |
| 6,912,228 B1 * | 6/2005 | Dahlman et al. ........... 370/441 |
| 6,996,069 B2 * | 2/2006 | Willenegger ................ 370/252 |
| 2002/0009061 A1 * | 1/2002 | Willenegger ................ 370/328 |
| 2002/0034170 A1 * | 3/2002 | Tiedemann et al. ......... 370/335 |
| 2003/0078067 A1 * | 4/2003 | Kim et al. .................. 455/522 |
| 2005/0208961 A1 * | 9/2005 | Willenegger ................ 455/522 |

FOREIGN PATENT DOCUMENTS

JP          2000 324139          11/2000

OTHER PUBLICATIONS

International Search Report dated Apr. 9, 2002.
"High Speed Downlink Packet Access", TSG-RAN Working Group 2 #18 Edinburgh, United Kingdom, Jan. 15-19, 2001, pp. 1-26.

* cited by examiner

TRANSMITTING DEVICE AND TRANSMITTING METHOD

TECHNICAL FIELD

The present invention relates to a transmission apparatus and transmission method to perform radio transmission in which downlink shared channel such as DSCH (Downlink Shared Channel) and dedicated physical channel such as DPCH (Dedicated Physical Channel) are code-multiplexed, particularly, relates to a transmission apparatus and transmission method which carry out transmission power control in the DPCH.

BACKGROUND ART

CDMA (Code Division Multiple Access) system using spread spectrum technology as a multiple access method in which a plurality of communication apparatuses communicate mutually have been researched broadly, and practical use has been reached. The major advantage of the CDMA system is the ability to accommodate a large number of users because it can be designed to have a high-level of security, interference resistance and superior frequency efficiency. In addition, there is an increasing demand for transmitting a large amount of data such as image data, etc. within a short time in a downlink channel, with diversification of the recent services in the mobile communication field.

Under the background of 3GPP (Third Generation Partnership Project) which is one of the standard organizations relating to a CDMA system, use of DSCH as a common channel in high-speed data transmission of the downlink channel is under consideration. The DSCH is used in a cellular system as shown below. That is to say, abase station apparatus controls the transmission formats such as modulation method, transmission rate, user assignment, etc. of a DSCH channel every one frame, and the data is transmitted to a communication terminal apparatus. The control contents of such transmission formats are notified to a communication terminal apparatus using TFCI (Transmit Format Combination Indicator) included in DPCH which is assigned individually to each communication terminal apparatus. The communication terminal apparatus learns the transmission formats of the DSCH with reference to this TFCI, and can obtain the received data after demodulating the data of DSCH. Hence, those DSCH and DPCH are code-multiplexed and then transmitted.

If a plurality of channels are code-multiplexed as described above, there is a problem that the signal to a target user could interfere the other users. The transmission power control, in which the effect of interference to other stations is reduced by adaptively changing the transmission power in the transmitting side so that an optimum reception level can be obtained in the receiving side, is widely known as a technology to reduce the interference to other stations.

Among such a transmission power control, a closed-loop transmission power control in which a TPC (Transmit Power Control) command to instruct an increase/decrease of transmission power so that the SIR (Signal to Interference Ratio) which is measured in the communication terminal apparatus based on the receiving signal of the downlink channel approaches a predetermined desired SIR (hereinafter, it is referred to as "desired SIR") is generated, and the increase/decrease of the transmission power based on the TPC command, is performed in the base station apparatus.

However, if DSCH and DPCH are multiplexed together, there is a problem that DSCH could be an interference to DPCH, and the transmission power control cannot be appropriately carried out in the DPCH. In other words, since a packet is transmitted in burst in DSCH, an interference level is rapidly fluctuated in the period where the packet is inserted as well as in the period where the packet is not inserted, and consequently, there is a problem that the transmission power control in DPCH cannot follow the rapid fluctuation of such an interference.

DISCLOSURE OF INVENTION

It is an object of the present invention to provide a transmission apparatus and a transmission method that are capable of carrying out an optimum transmission power control in a dedicated channel, even in the case that a downlink shared channel (for instance, DSCH, etc.) and a dedicated channel (for instance, DPCH, etc.) are multiplexed.

According to one aspect of the present invention, a transmission apparatus comprises a transmission power control section which controls the transmission power of a dedicated channel so that the transmission power in a period corresponding to a packet insertion period of downlink shared channel becomes larger than other periods, an amplification section which amplifies the transmission power of the dedicated channel in accordance with the control of said transmission power control section, and a radio transmission section which code-multiplexes the dedicated channel of which the transmission power was amplified by said amplification section and said downlink shared channel.

According to another aspect of the present invention, a transmission apparatus comprises an assignment section which assigns packets to all data domain region of a downlink shared channel, a controlling section which controls the transmission power of the dedicated channel based on a TPC command, an amplification section which amplifies the transmission power of the dedicated channel based on the control of said controlling section, and a radio transmission section which code-multiplexes the dedicated channel of which transmission power was amplified by said amplification section and the downlink shared channel of which the packets are assigned in all data domain by said assignment section.

According to a still further aspect of the present invention, a transmission method comprises a transmission power control step of controlling the transmission power of a dedicated channel so that the transmission power in a period corresponding to a packet insertion period of a downlink shared channel becomes larger than other periods, an amplification step of amplifying the transmission power of the dedicated channel in accordance with the control in said transmission power control step, and a radio transmission step to code-multiplex the dedicated channel of which the transmission power was amplified in said amplification step and said downlink shared channel.

According to a still further aspect of the present invention, a transmission method comprises an assignment step of assigning packets to all data domain region of a downlink shared channel, a controlling step of controlling the transmission power of the dedicated channel based on a TPC command, an amplification step of amplifying the transmission power of the dedicated channel based on the control in said controlling step, and a radio transmission step of code-multiplexing the dedicated channel of which transmission power was amplified in said amplification step and the downlink shared channel of which the packets are assigned in all data domain region in said assignment step.

BEST MODE FOR CARRYING OUT THE INVENTION

A first gist of the present invention is to keep the reception quality (for instance, SIR) in the receiving side within a predetermined range by increasing the transmission power of the period corresponding to packet insertion period of downlink shared channel (for instance, DSCH, etc.) among transmission power of dedicated channel (for instance, DPCH, etc.) to be larger than other periods. A second gist of the present invention is to keep the reception quality in the receiving side within a predetermined range by reducing the transmission rate and hence removing empty slots. Here, the predetermined range is the range from which the desired reception quality is attained in transmission power control.

Hereafter, embodiments of the present invention will be described specifically with reference to the accompanying drawings.

In each embodiment, DSCH is explained as an example of downlink shared channel employed commonly to all communication terminal apparatus of the respective cell. In addition, the DPCH is explained as an example of a dedicated channel assigned individually to each user. Services such as data communication, etc., of which the real-time communication is not required are mainly offered by DSCH whereas services such as speech communication, etc., of which real-time communication is required are offered by DPCH. Moreover, SIR is explained as an example of the reception quality.

(Embodiment 1)

Figure 1:
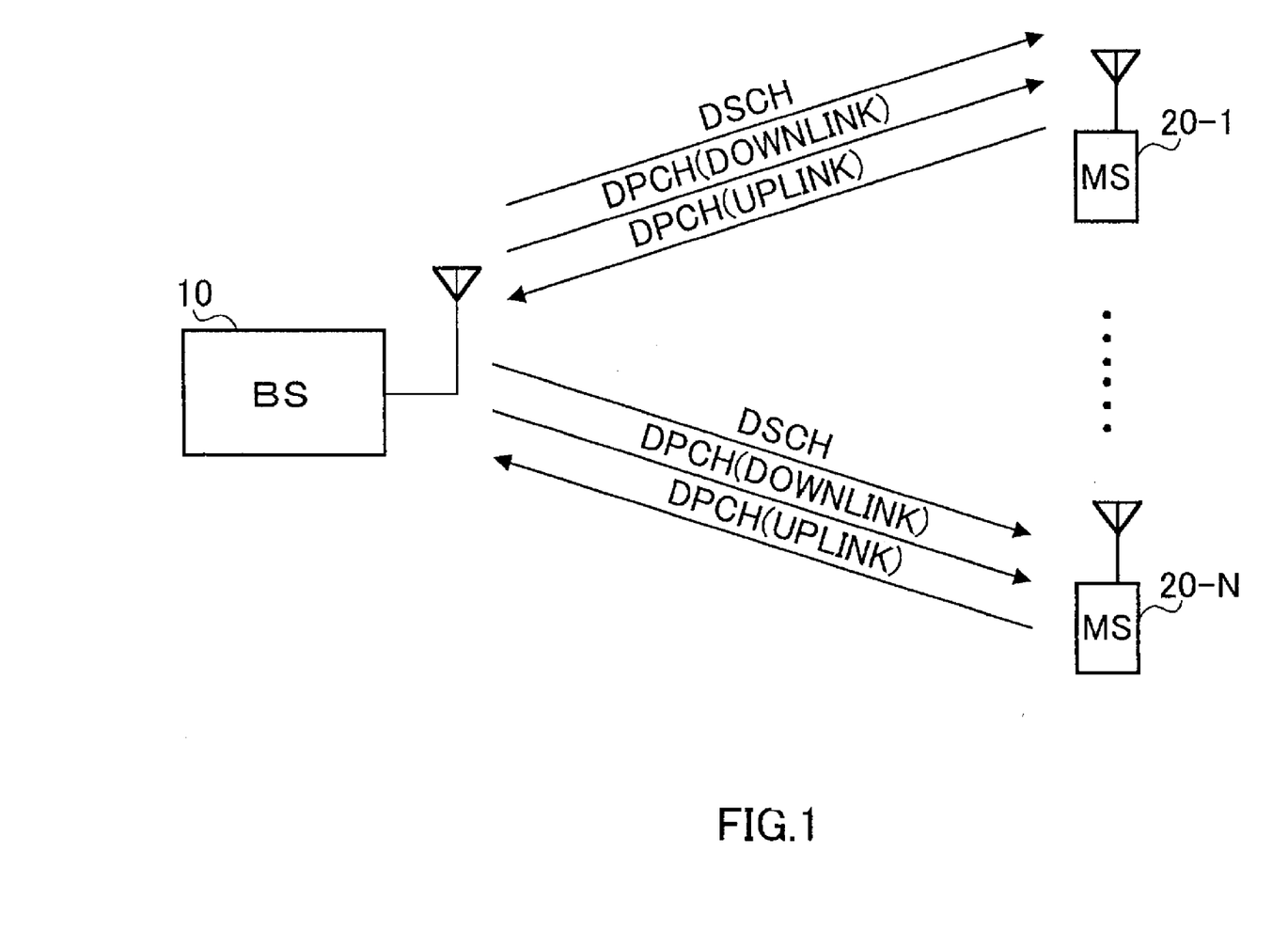
FIG. 1 is a schematic configuration of a radio communication system including a transmission apparatus according to Embodiment 1 of the present invention.

FIG. 1 is a schematic configuration of a radio communication system including a transmission apparatus according to Embodiment 1 of the present invention.

As shown in this drawing, base station apparatus 10 communicates with communication terminal apparatuses accommodated in the same cell (hereinafter, it is referred to as "MS") numbered from 20-1 to 20-N through a bi-directional propagation path, uplink and downlink. That is to say, base station apparatus 10 transmits data signals or control signals, etc., on the downlink channel using DSCH and DPCH while MS 20-1 to 20-N transmit data signals or control signals, etc., on the uplink channel using DPCH. Those DSCH and DPCH are separated by mutually-different spreading code assigned to each. Additionally, the uplink and downlink DPCH are separated based on frequency division or time division.

Figure 2:
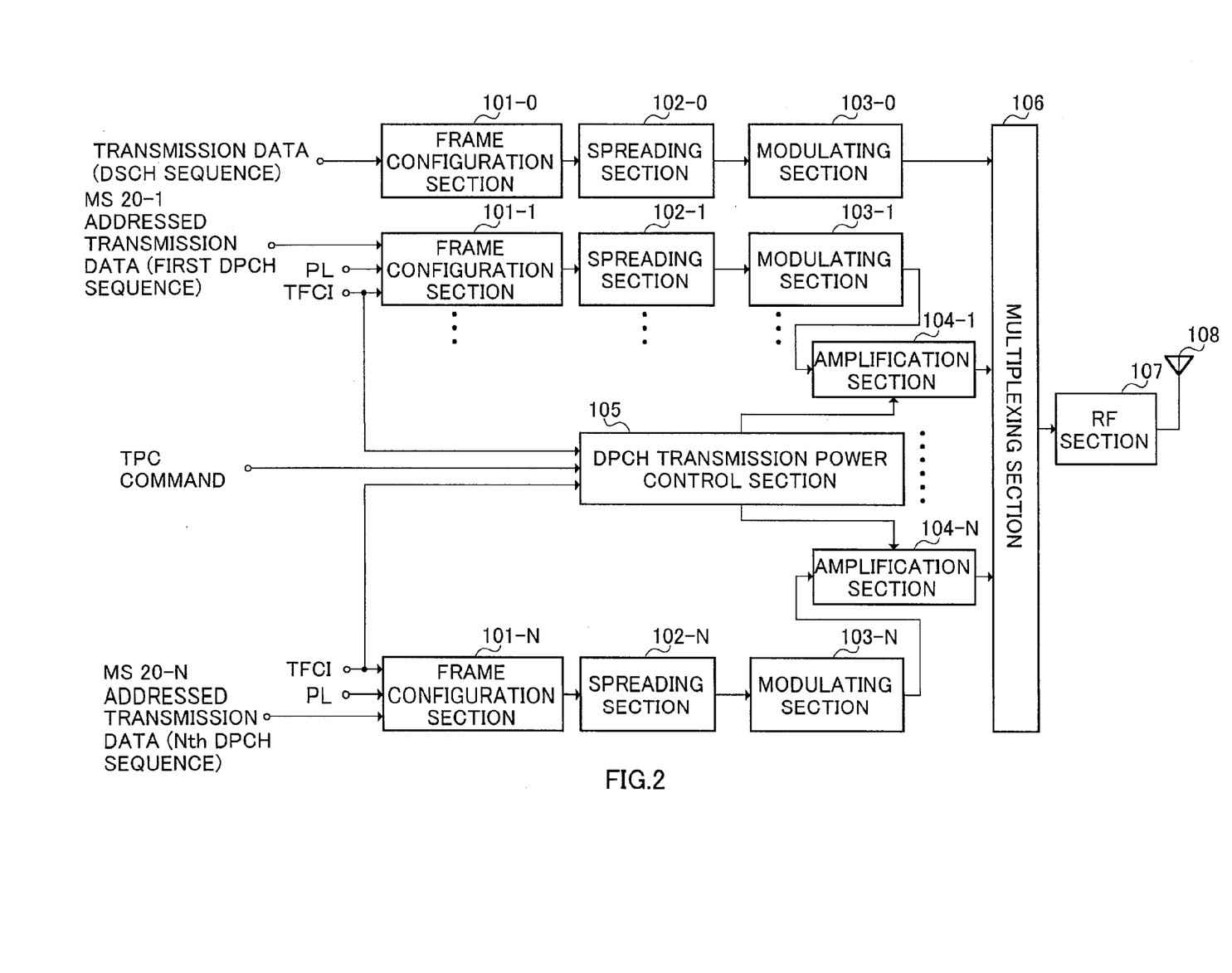
FIG. 2 is a block diagram showing a configuration of a transmission apparatus provided in a base station apparatus shown in FIG. 1.

FIG. 2 is a block diagram showing a configuration of a transmission apparatus provided in the base station apparatus 10 shown in FIG. 1.

First, the DSCH serial configuration which is mainly consisting of frame configuration section 101-0, spreading section 102-0 and modulating section 103-0 will be explained. Frame configuration section 101-0 performs time-division multiplexing on the transmission data addressed to each user, and the transmission signal of a DSCH sequence is generated. The transmission signal of the generated DSCH sequence is subjected to spreading processing in spreading section 102-0, modulated in modulating section 103-0 by a predetermined modulation method and outputted to multiplexing section 106.

Next, the first DPCH serial configuration which is mainly consisting of frame configuration section 101-1, spreading section 102-1, modulating section 103-1 and amplification section 104-1 will be explained. In such a first DPCH sequence, a transmission signal addressed to MS20-1 is generated. That is to say, frame configuration section 101 time-multiplexes the transmission data addressed to MS20-1, pilot symbol (PL) and TFCI, and a transmission signal which is addressed to MS20-1 is generated. The generated transmission signal addressed to MS20-1 is subjected to spreading processing in spreading section 102-1, modulated in modulating section 103-1 by a predetermined modulation technique, amplified in amplification section 104-1 based on the control of DPCH transmission power control and outputted to multiplexing section 106. Next, the transmission signals addressed to MS 20-1 up to MS 20-N are generated in a similar way as the first DPCH sequence in the second DPCH sequence up to the Nth DPCH sequence, and the generated transmission signal which is addressed to every MS is outputted to multiplexing section 106.

DPCH transmission power control section 105 detects the period where the packet is inserted and the period where the packet is not inserted in the DSCH channel based on TFCI while controlling the transmission power in the amplification sections 104-1 to 104-N based on TPC commands obtained by MS 20-1 to MS 20-N, controls amplification section 104-1 to amplification section 104-N and increases the transmission power of the DPCH periods with a predetermined amount according to the periods where the packets are inserted in the DSCH (hereinafter, it is referred to as "packet insertion period").

Multiplexing section 106 code-multiplexes the transmission signal of the DSCH sequence and the transmission signal addressed to MS 20-1 to MS 20-N and outputs the result to RF section 107. RF section 107 frequency-converts the multiplexing signal transmitted from multiplexing section 106 into a radio frequency bandwidth and transmits the result as radio signal from antenna 108.

An operation of the radio communication section which has the aforementioned configuration will be explained below.

The transmission data to be transmitted using DSCH is frame-configured in frame configuration section 101-0, subjected to spreading processing using a predetermined spreading code in spreading section 102-0, modulated in modulating section 103-0 using a predetermined modulation method and outputted to multiplexing section 106.

On the other hand, the transmission data addressed to MS 20-1 to MS 20-N are frame-configured in frame configuration sections 101-1 to 101-N, subjected to spreading processing using predetermined spreading codes in spreading sections 102-1 to 102-N, modulated using predetermined modulation method in modulating sections 103-1 to 103-N, amplified based on the control of DPCH transmission power control section 105 in amplification sections 104-1 to 104-N, respectively, and outputted to multiplexing section 106.

In multiplexing section 106, the transmission signal addressed to MS 20-1 to MS 20-N and transmission signal of DSCH sequence are both code-multiplexed and outputted to RF section 107. The multiplexed signal is frequency-converted into a radio frequency bandwidth in RF section 107 and transmitted as radio signal from antenna 108.

Accordingly, the signal transmitted from base station apparatus 10 is received by each of the MS 20-1 to MS 20-N. In each of the MS 20-1 to MS 20-N, the received signal is subjected to despreading processing, the DSCH and DPCH assigned to the respective MS are extracted from the received signal. Each of the MS 20-1 to MS 20-N detects the extracted desired signal power of the DPCH of the addressed MS and interference signal power, obtains the SIR by calculating the ratio between those desired signal power and interference signal power. MS 20-1 to MS 20-N, thus, compares the above measured SIR (hereinafter, it is referred to as "measured SIR") with a previously set standard SIR, when the measured SIR is larger than standard SIR a TPC command which indicates a decreasing of transmission power is generated, on the contrary, when the measured SIR is smaller than standard SIR a TPC command which indicates an increasing of transmission power is generated. The generated TPC command is transmitted to base station apparatus 10.

Figure 3:
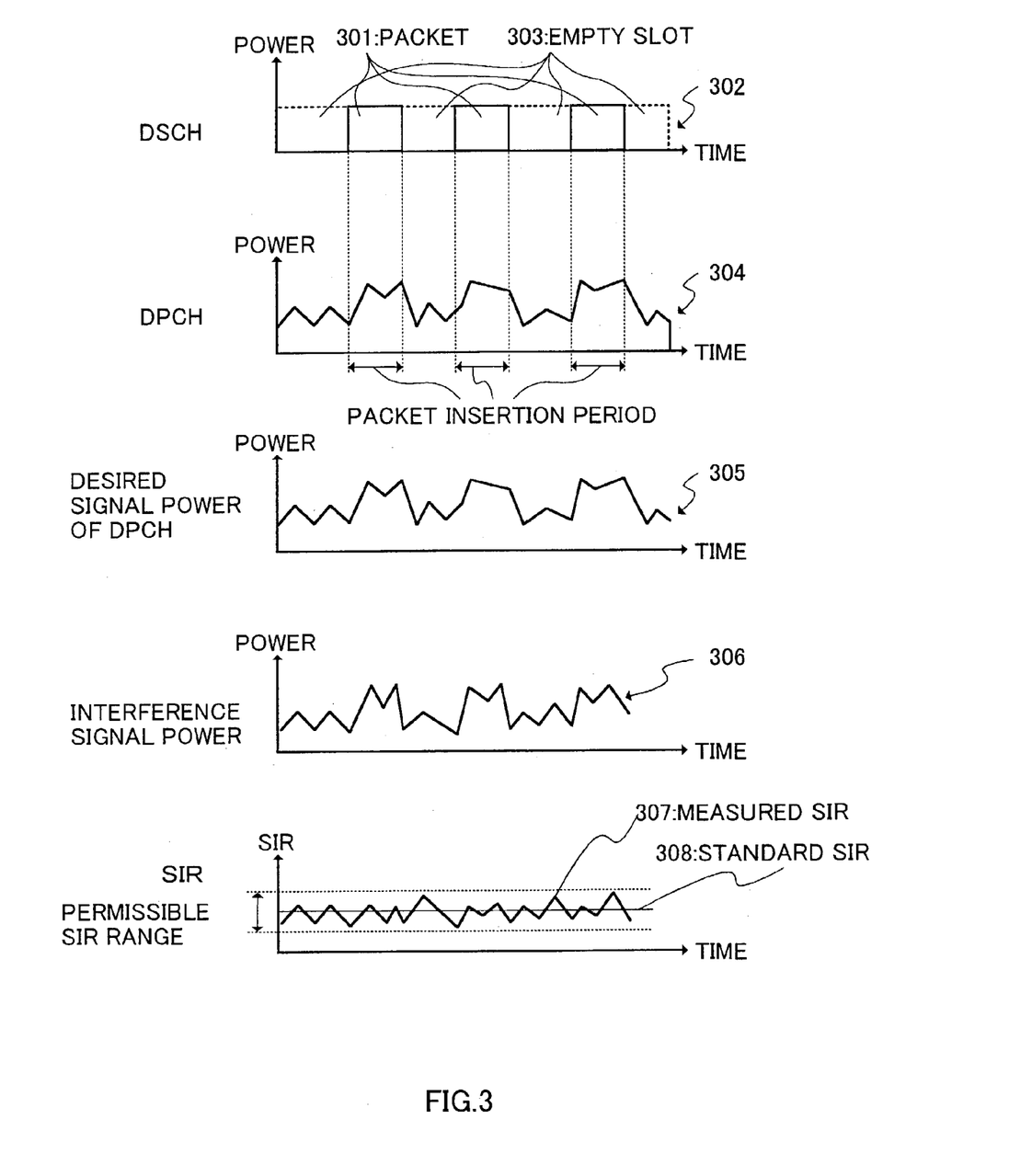
FIG. 3 is illustration graphs to illustrate SIR measurement in a communication terminal apparatus of a radio communication system according to Embodiment 1 of the present invention.

The SIR measured in the communication terminal apparatus of the radio communication system according to the present invention will be explained below with reference to FIG. 3.

First, in the DSCH sequence of base station apparatus 10, packets 301 addressed to each user that is time-multiplexed in the transmission signal 302 of the DSCH sequence are generated. In the present specification, those inserted packets 301 are called "packet insertion period". The periods where packets 301 are not inserted among transmission signal 302, that is to say, the periods excluding those where packets are inserted in, became an empty slots 303 in DSCH. Since packets 301 are transmitted with a constant power which is comparatively larger than the zero transmitted power in the periods which became an empty slot 303 in DSCH, the transmission power rapidly fluctuates in the periods excluding the packet inserted periods.

In DPCH sequence of base station apparatus 10, the transmission data of an addressed MS corresponds to such a DPCH sequence is multiplexed with PL and TFCI, amplified in amplification section 104-1 to 104-N based on the control of DPCH transmission power control section 105, and transmission signal of DPCH sequence is generated. Because DPCH transmission power control section 105 controls amplification sections 104-1 to 104-N so that the transmission power of the periods correspond to DSCH packet insertion period becomes larger than the transmission power in other periods, the transmission power of the periods correspond to DSCH packet insertion period in DPCH becomes larger than that of other periods.

According to the amplified DPCH received by MS 20-1, the desired signal power 305 is detected in MS 20-1. The interference signal power 306 is also detected in MS 20-1. Due to the interference caused in DSCH, the interference signal power 306 in the periods correspond to DSCH packet insertion periods suddenly becomes larger than that of other periods.

Because the transmission power of DPCH is increased by the control of DPCH transmission power control section 105 in the period in which the interference signal power 306 is increased, namely, in packet insertion period, desired signal power 305 follows the interference signal power 306. The measured SIR 307 obtained by calculating the ratio between such a desired signal power 305 and interference signal power 306 serves generally as a constant value, and fluctuates around the standard SIR 308 within a predetermined range of the permissible SIR. In other words, DPCH transmission power control section 105 increases the transmission power of the periods corresponding to packet insertion period by an increasing rate so that the measured SIR approaches the permissible SIR range. Such an increasing rate can be calculated by using parameters assigned beforehand in the system such as DSCH transmission power or power step of the permissible SIR range, etc.

Such a permissible SIR range shows the range which is permitted as the value that the measured SIR takes in transmission power control. That is, if the measured SIR 307 takes a value smaller than the permissible SIR range, the reception quality will be deteriorated so that it cannot be approved in the system, and if the measured SIR 307, on the other hand, takes a value larger than the permissible SIR range, interference to other channels which is not permissible becomes large.

Moreover, because the control of increasing the transmission power of DPCH in packet insertion period is performed by DPCH transmission power control section which is provided in base station apparatus 10 in the present embodiment, it is possible to keep the measured SIR within the permissible SIR range even in the case when the interference by DSCH is increased suddenly.

Figure 4:
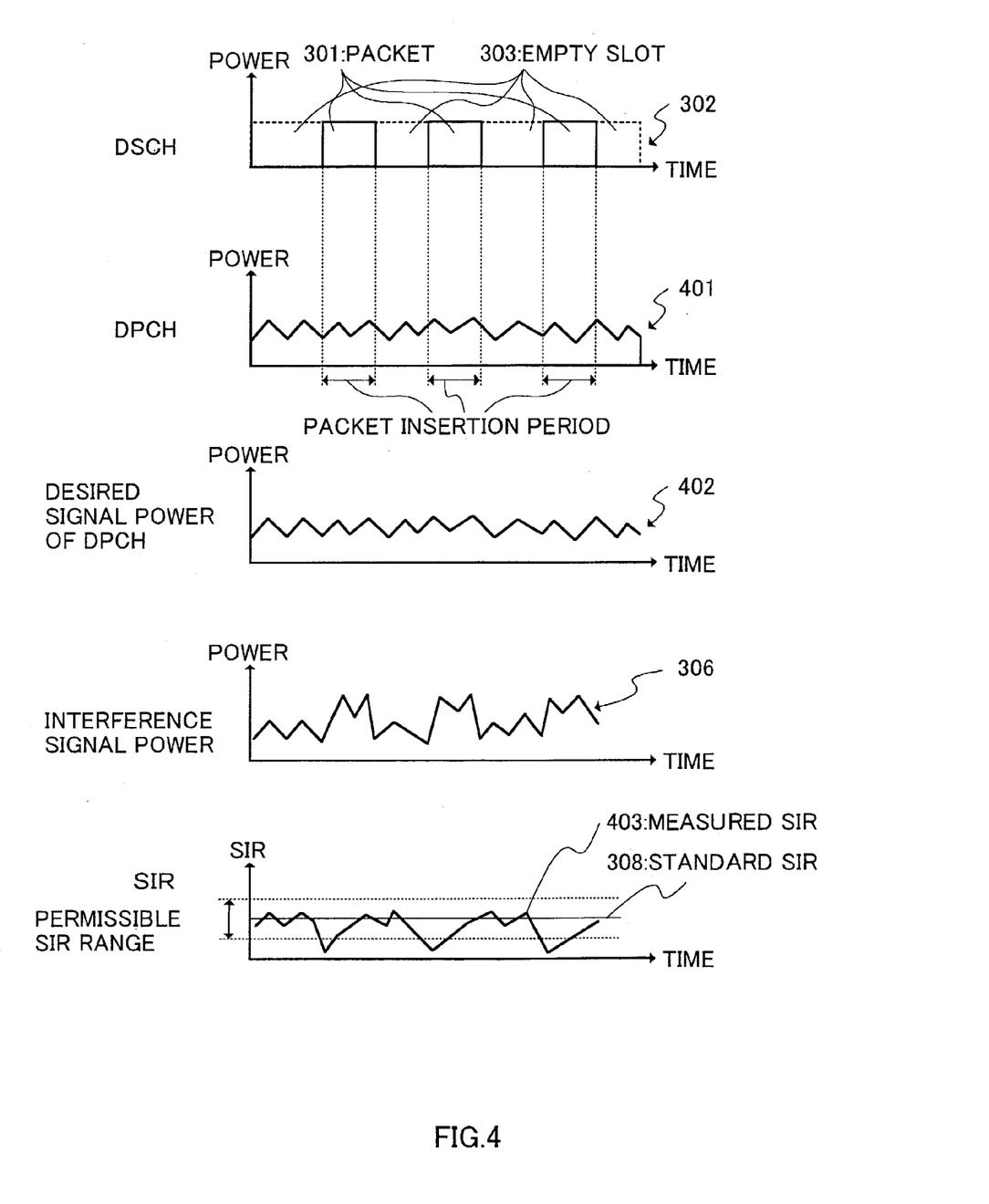
FIG. 4 is illustration graphs to illustrate SIR measurement in the case of using a conventional transmission power control as an example to be compared with FIG. 3.

For comparison purpose, the measured SIR in the case when using the conventional transmission power control after code-multiplexing DSCH and DPCH will be explained here with reference to FIG. 4. In addition, the portions shown in FIG. 4 which are similar to those shown in FIG. 3 are assigned the same reference numerals as in FIG. 3, and explanations thereof are omitted.

Because the control of increasing the transmission power control is not carried out particularly in other periods than the packet insertion periods in the conventional transmission power control, the transmission power of DPCH is increased/decreased based on the TPC command, and transmission signal 401 of DPCH sequence is generated. Hence, the transmission signal of DSCH is the same in FIG. 3 and FIG. 4. The transmission signal 401 of DPCH sequence is received in MS 20-1, and the desired signal power 402 is detected. Additionally, the interference signal power 306 in the MS 20-1 is the same as that in FIG. 3. The SIR measurement is obtained when taking the ratio between the desired signal power 402 and interference signal power 306. The measured SIR 403 cannot follow the sudden increasing of the interference amount in packet insertion period of DSCH, and it will be less than the minimum of the permissible SIR range in packet insertion period. Hence, the reception quality will be deteriorated in the period where the measured SIR was less than the minimum of the permissible SIR range.

According to the aforementioned description of the present embodiment, it is possible to change the measured SIR within the permissible SIR range by increasing the transmission power of DPCH in packet insertion period more than that of other periods by DPCH transmission power control section 105. Therefore, transmission power control of DPCH according to the present embodiment can be carried out with sufficient accuracy even in the case when the interference amount is suddenly increased by DSCH.

(Embodiment 2)

Figure 5:
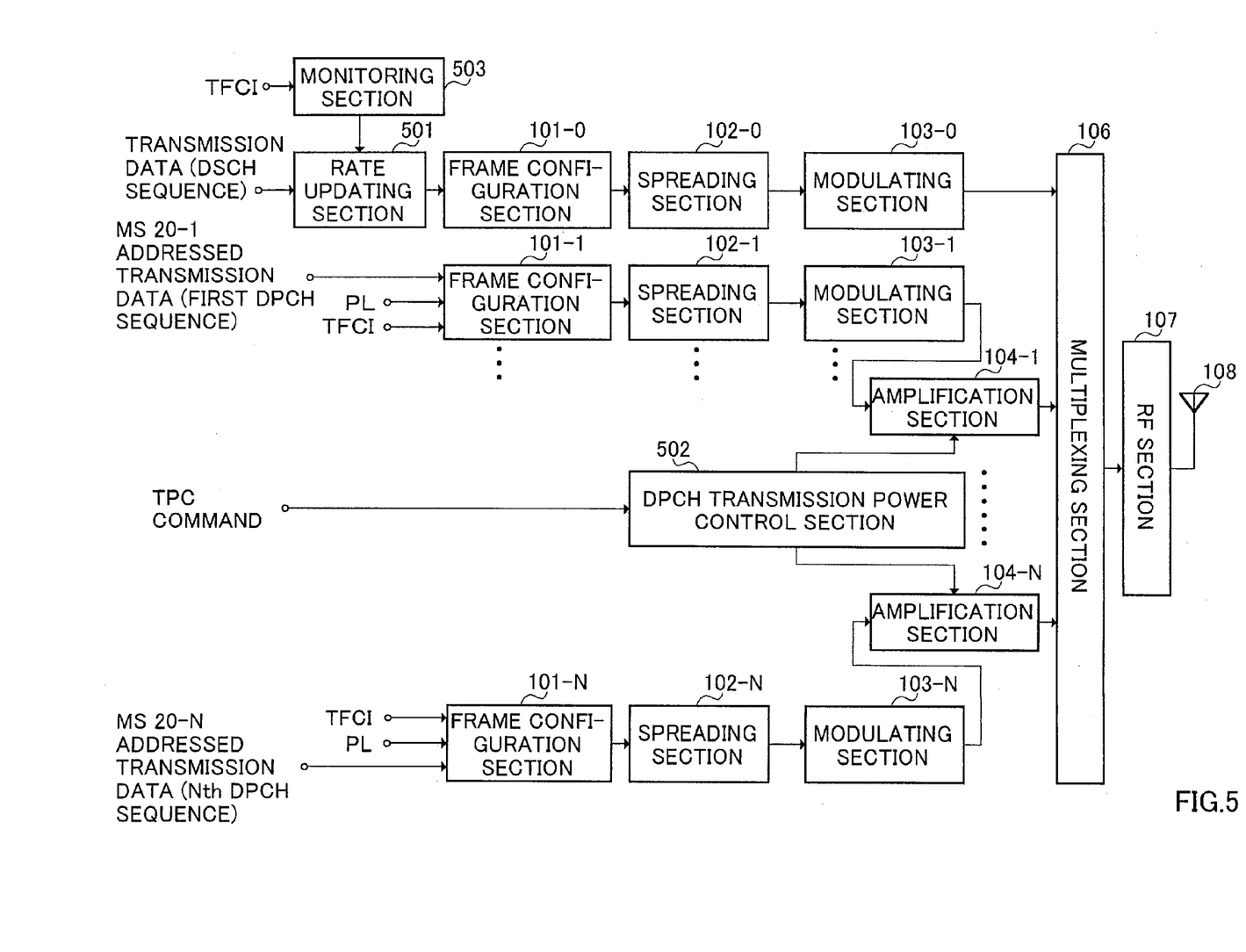
FIG. 5 is a block diagram showing a configuration of a transmitting apparatus according to Embodiment 2 of the present invention.

FIG. 5 is a block diagram showing a configuration of a transmission apparatus according to Embodiment 2 of the present invention. The transmission apparatus according to the present embodiment changes the configuration of the transmission apparatus provided in base station apparatus of the radio communication system described in Embodiment 1 by adding more sections. In addition, the corresponding similar sections shown in FIG. 2 according to Embodiment 1 are assigned the same reference numerals in FIG. 5 and explanations thereof are omitted. Decreasing the data rate of DSCH before transmission is the big different point between the transmission apparatus according to the present embodiment and transmission apparatus according to Embodiment 1.

Monitoring section 503 monitors DSCH referring to TFCI and detects empty slot which exists in DSCH. When the existence of empty slot is detected in monitoring section 503, rate updating section 501 reduces the transmission rate of DSCH in order to remove the empty slot. In other words, when the existence of empty slot is detected in monitoring section 503, rate updating section 501 allocates the data packet in DSCH so that the packet occupies all the domain region valuable for packet allocation (hereinafter, it is referred to as "data domain region"). The DPCH transmission power control section 502 controls the transmission power in amplification sections 104-1 to 104-N based on a TPC command obtained by MS 20-1 to MS 20-N.

Figure 6:
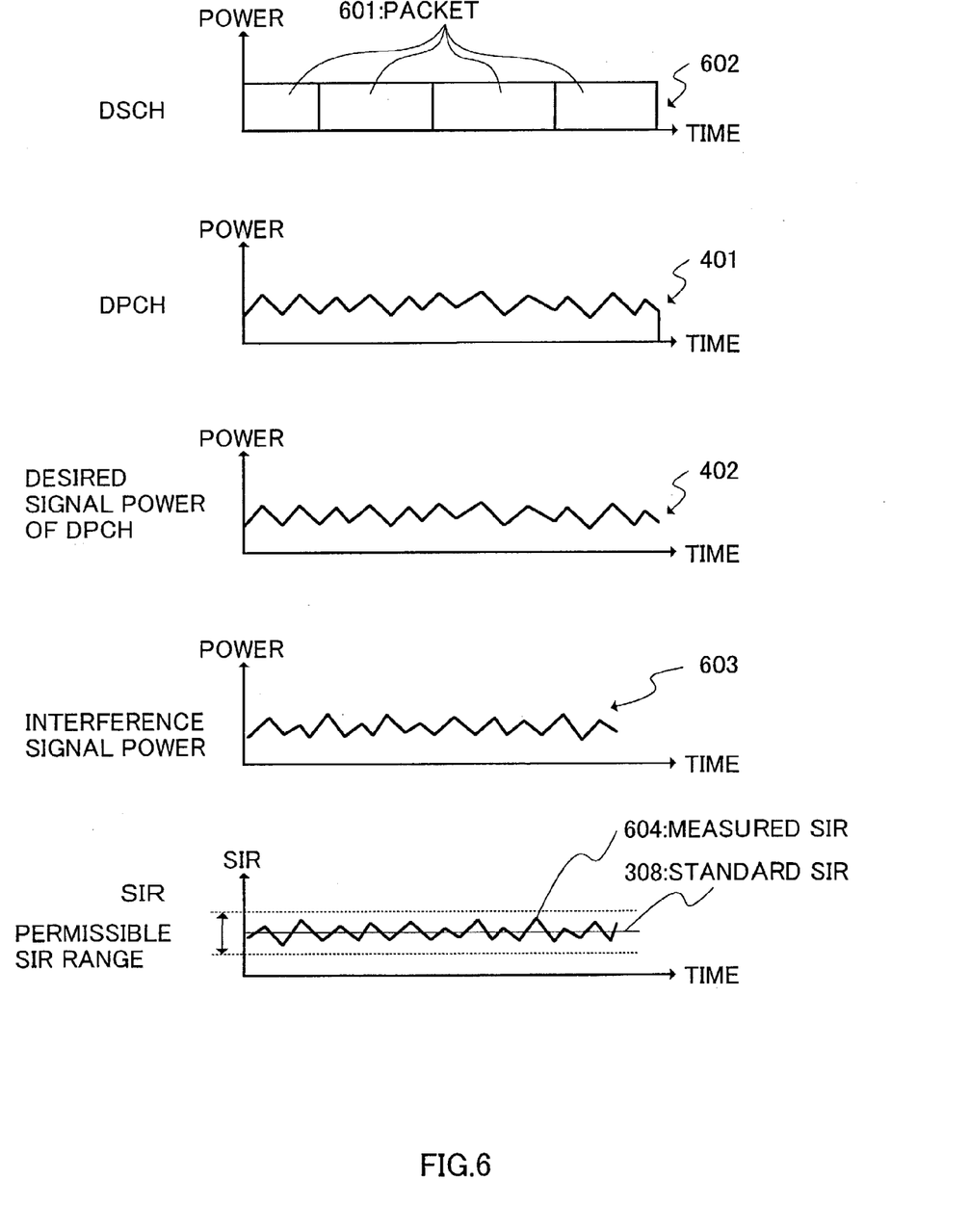
FIG. 6 is illustration graphs to illustrate SIR measurement in a communication terminal apparatus of a radio communication system according to Embodiment 2 of the present invention.

The SIR measurement in communication terminal apparatus of the radio communication system according to the present embodiment will be explained below with reference to FIG. 6. Moreover, the portions in FIG. 6 similar to those in FIG. 4 are assigned the same reference numerals and explanation thereof will be omitted.

In DSCH sequence of the base station apparatus 10, the transmission signal 602 of the DSCH sequence is generated by time-multiplexing the packets 601 of each addressed user. Since the transmission rate is reduced by rate updating section 501, the transmission signal 602 of the DSCH sequence allocates the packets in all data domain region to remove the empty slots. However, the transmission power of transmission signal 602 of DSCH sequence is always fixed. The interference signal power 603 in MS 20-1 to MS 20-N generally has constant value because there is no sudden increasing of the interference by DSCH.

The SIR 604 is measured by calculating the ratio between the aforementioned desired signal power 305 and interference signal power 306. As described above, the measured SIR 604, in general, has a constant value or fluctuates within the permissible SIR range since there is no sudden increasing of the interference of DSCH.

According to the above description of the present embodiment, since rate updating section 501 reduces the DSCH transmission rate so that no empty slots exist, sudden fluctuation in the transmission power of DSCH will not be generated. Thus, even when DPCH and DSCH are employed commonly to carry out communication, a high precision transmission power control in the DPCH can be performed as it is possible to prevent the measured SIR 604 to fluctuate, due to sudden fluctuation of the interference signal power, out of the permissible SIR range.

Figure 7:
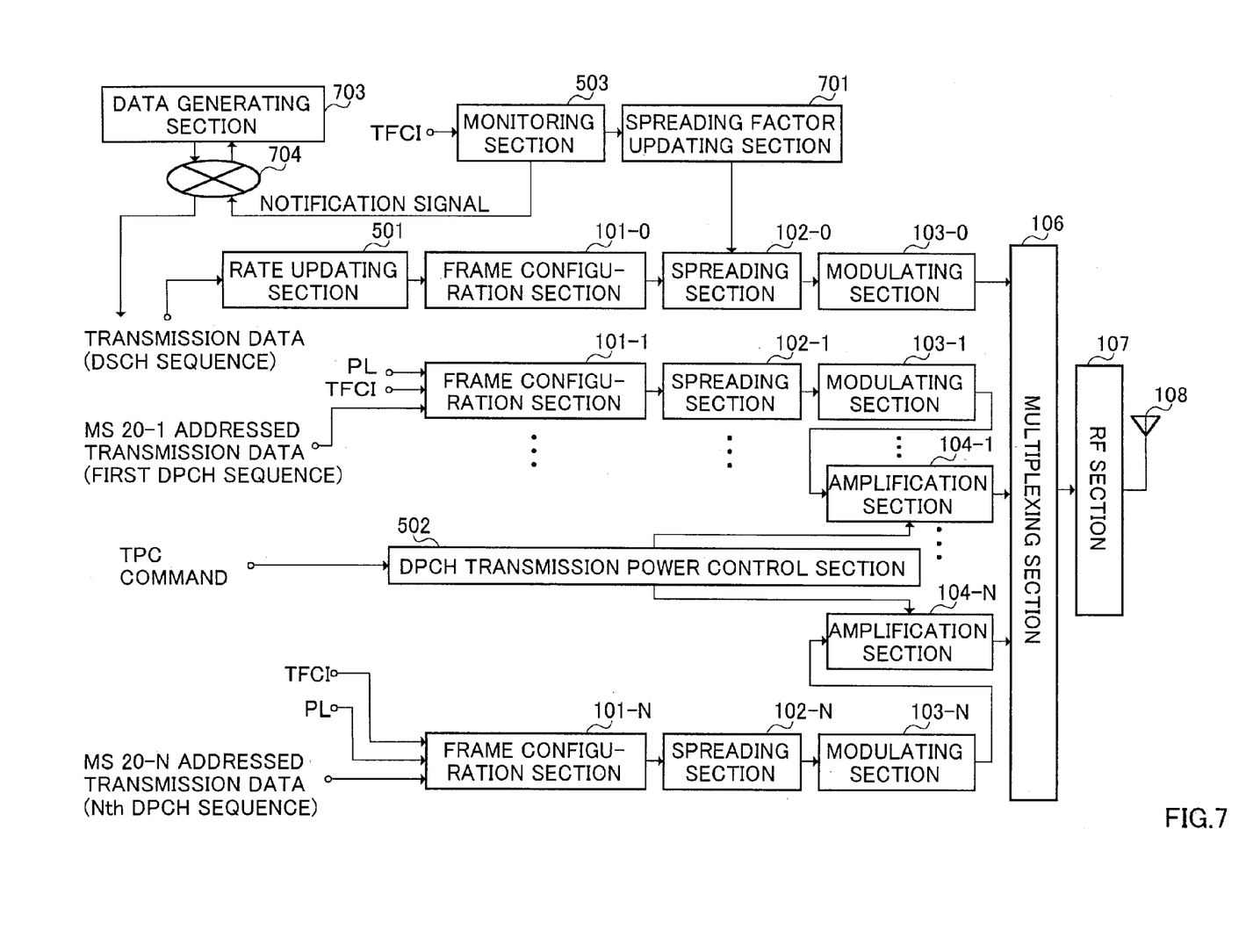
FIG. 7 is a block diagram showing an exemplary configuration of a transmission apparatus in the case that the transmission rate is changed by changing a spreading factor.

Moreover, when empty slot in DSCH is generated as described above in accordance to the present invention, the transmission power of DSCH is kept constant by reducing the transmission rate to remove the empty slot, but as a practical method to reduce the transmission rate, for instance, increasing of spreading factor can be considered. FIG. 7 is a block diagram showing an exemplary configuration of a transmission apparatus of such a case. Sections in FIG. 7 similar to those in FIG. 5 are assigned the same reference numerals and explanations thereof will be omitted.

Spreading factor updating section 701 increases the spreading factor in order to reduce the transmission rate of DSCH to remove the empty slot in the case when the existence of empty slots is detected in monitoring section 503. That is to say, when there is a signal of the same information rate, for instance, a half-rate (½) signal can be transmitted if doubling the spreading factor which is taken as an advantage to control the transmission rate.

Moreover, because there is a possibility that buffer 702 of the base station apparatus 10 is overloaded and may cause losing of data if the data rate of the original signal source (data generating section 703) is not reduced even if the rate of the signal which is transmitted over a radio channel (transmission rate) is reduced, such an effect is notified to the signal source (data generating section 703) so as to reduce data rate of the signal source (data generating section 703). Here, data generating section 703, for instance, is an arbitrary terminal apparatus (personal computer, telephone, etc.) which is connected to network 704 and it is connected with base station apparatus 10 via network 704. Of course, such a notification device can be added to the configuration shown in FIG. 5 (more general configuration having rate updating section 501).

As described above in accordance to the present embodiment, for example, since the desired signal power of DPCH can follow the sudden fluctuations of the interference signal power in DSCH by increasing the transmission power of the dedicated channel (such as DPCH, etc.) in the periods corresponding to the periods (packet insertion periods) in which the interference in downlink shared channel (such as DSCH, etc.) was increased, it is possible to execute an appropriate transmission power control in the dedicated channel even in the case when downlink shared channel such as DSCH and dedicated channel such as DPCH are multiplexed together.

Furthermore, according to the present invention, since it is possible to keep the transmission power of a downlink shared channel constant by assigning packets in all data domain region of the downlink shared channel (such as DSCH, etc.) so that empty slots are no longer exist in the downlink shared channel, sudden fluctuations of interference signal power no longer occurred and hence appropriate transmission power control in the dedicated channel can be executed even in the case when downlink shared channel such as DSCH and dedicated channel such as DPCH are multiplexed together. The assignment of packets in all data domain region is performed by reducing the transmission rate of data, for example, when there is empty slot in the downlink shared channel.

The present application is based on the Japanese Patent Application No. 2001-005678 filed on Jan. 12, 2001, entire content of which is expressly incorporated by reference herein.

INDUSTRIAL APPLICABILITY

The present invention is applicable to a transmission apparatus built in a base station apparatus in a mobile communication system.

The invention claimed is:

1. A radio transmission apparatus comprising:
   a control section that detects a packet insertion period and a packet non-insertion period in a downlink shared channel and controls a transmission power of a dedicated channel to increase a transmission power of a period in the dedicated channel corresponding to the detected packet insertion period with respect to a transmission power of a period in the dedicated channel corresponding to the detected packet non-insertion period;
   an amplification section that amplifies the transmission power of the dedicated channel based on the control by said control section; and
   a multiplexing section that code-multiplexes the dedicated channel, with the amplified transmission power, and the downlink shared channel.

2. A base station apparatus comprising the radio transmission apparatus according to claim 1.

3. A radio transmission apparatus comprising:
   a detecting section that detects an empty slot in a downlink shared channel;
   an assignment section that assigns packets to all of the data domain region of the downlink shared channel including the detected empty slot, by reducing a data transmission rate of the downlink shared channel;
   a control section that controls a transmission power of a dedicated channel;
   an amplification section that amplifies the transmission power of the dedicated channel based on the control by said control section; and
   a multiplexing section that code-multiplexes the dedicated channel, with the amplified transmission power, and the downlink shared channel, with all of the data domain region to which packets are assigned.

4. The radio transmission apparatus according to claim 3, wherein:
   said assignment section reduces the data transmission rate by increasing a spreading factor of the downlink shared channel.

5. The radio transmission apparatus according to claim 4, further comprising:
   a notification section that notifies to a signal source of the downlink shared channel an instruction that a data rate of the signal source be reduced when the data transmission rate is reduced by said assignment section.

6. A base station apparatus comprising the radio transmission apparatus according to claim 3.

7. A radio transmission method comprising:
   detecting a packet insertion period and a packet non-insertion period in a downlink shared channel;
   controlling a transmission power of a dedicated channel to increase a transmission power of a period in the dedicated channel corresponding to the detected packet insertion period with respect to a transmission power of a period in the dedicated channel corresponding to the detected packet non-insertion period;
   amplifying the transmission power of the dedicated channel based on the control; and
   code-multiplexing the dedicated channel, with the amplified transmission power, and the downlink shared channel.

8. A radio transmission method comprising:
   detecting an empty slot in a downlink shared channel;
   assigning packets to all of the data domain region of the downlink shared channel including the detected empty slot, by reducing a data transmission rate of the downlink shared channel;
   controlling a transmission power of a dedicated channel;
   amplifying the transmission power of the dedicated channel based on the control; and
   code-multiplexing the dedicated channel, with the amplified transmission power, and the downlink shared channel, with all of the data domain region to which packets are assigned.

* * * * *